(12) United States Patent
Frayne

(10) Patent No.: US 7,821,144 B2
(45) Date of Patent: Oct. 26, 2010

(54) GENERATOR UTILIZING FLUID-INDUCED OSCILLATIONS

(75) Inventor: Shawn M. Frayne, Tampa, FL (US)

(73) Assignee: Humdinger Wind Energy, LLC, Honolulu, HI (US)

( * ) Notice: Subject to any disclaimer, the term of this patent is extended or adjusted under 35 U.S.C. 154(b) by 0 days.

(21) Appl. No.: 12/506,099

(22) Filed: Jul. 20, 2009

(65) Prior Publication Data

US 2009/0309362 A1 Dec. 17, 2009

Related U.S. Application Data

(63) Continuation of application No. 11/566,127, filed on Dec. 1, 2006, now Pat. No. 7,573,143.

(51) Int. Cl.
*F03G 7/80* (2006.01)
(52) U.S. Cl. .................. 290/1 R; 290/40 C; 60/513
(58) Field of Classification Search ............... 290/1 R, 290/40 C; 60/513
See application file for complete search history.

(56) References Cited

U.S. PATENT DOCUMENTS

| | | |
|---|---|---|
| 3,686,520 A | 8/1972 | Campagnuolo et al. |
| 3,772,541 A | 11/1973 | Campagnuolo et al. |
| 3,798,475 A | 3/1974 | Campagnuolo et al. |
| 4,024,409 A | 5/1977 | Payne |
| 4,184,805 A | 1/1980 | Arnold |
| 4,348,594 A | 9/1982 | Lipfert |
| 4,396,852 A | 8/1983 | Hunt |
| 4,536,674 A | 8/1985 | Schmidt et al. |
| 5,223,763 A | 6/1993 | Chang |
| 5,395,592 A | 3/1995 | Bolleman et al. |
| 5,621,264 A | 4/1997 | Epstein et al. |
| 5,839,508 A | 11/1998 | Tubel et al. |

(Continued)

FOREIGN PATENT DOCUMENTS

DE  EP-A-0 977 345  2/2000

(Continued)

OTHER PUBLICATIONS

J. Energy, McKinney, et.al, The Wingmill: An Oscillating-Wing Windmill, 5(2) p. 109-115, 1981.

(Continued)

*Primary Examiner*—T C Patel
*Assistant Examiner*—Iraj A Mohandesi
(74) *Attorney, Agent, or Firm*—Jeffrey Schox

(57) ABSTRACT

An electrical generator including a magnetic field generator and at least one energy converter for converting energy present in fluid flows into vibrations or oscillations. The converter includes a flexible membrane having at least two fixed ends. The membrane vibrates when subject to a fluid flow. One of the electrical conductor and the magnetic field generator is attached to the membrane and configured to move with the membrane. The vibration of the membrane caused by the fluid flow causes a relative movement between the electrical conductor and the applied magnetic field. The relative movement causes a change in the strength of the magnetic field applied to the electrical conductor, and the change in the strength of the magnetic field applied to the electrical conductor induces a current flowing in the conductor.

45 Claims, 7 Drawing Sheets

U.S. PATENT DOCUMENTS

| | | |
|---|---|---|
| 5,955,790 A | 9/1999 | North |
| 6,011,346 A | 1/2000 | Buchanan et al. |
| 6,020,653 A | 2/2000 | Woodbridge et al. |
| 6,153,944 A | 11/2000 | Clark |
| 6,273,680 B1 | 8/2001 | Arnold |
| 6,424,079 B1 | 7/2002 | Carroll |
| 6,768,214 B2 | 7/2004 | Schultz et al. |
| 6,791,205 B2 | 9/2004 | Woodbridge |
| 6,849,963 B2 | 2/2005 | Grinsted et al. |
| 6,864,592 B1 | 3/2005 | Kelly |
| 7,012,340 B2 | 3/2006 | Yi |
| 7,023,104 B2 | 4/2006 | Kobashikawa |
| 7,148,591 B2 | 12/2006 | Mizoguchi et al. |
| 7,199,480 B2 | 4/2007 | Fripp et al. |
| 7,208,845 B2 | 4/2007 | Masters et al. |
| 7,224,077 B2 | 5/2007 | Allen |
| 7,280,845 B2 * | 10/2007 | Reemtsma .................. 455/558 |
| 7,414,325 B2 | 8/2008 | Pinkerton |
| 7,439,630 B2 * | 10/2008 | Peacock ..................... 290/1 R |
| 7,498,681 B1 | 3/2009 | Kellogg et al. |
| 7,573,143 B2 | 8/2009 | Frayne |
| 2005/0099010 A1 | 5/2005 | Hirsche |
| 2005/0230974 A1 | 10/2005 | Masters et al. |
| 2006/0016606 A1 | 1/2006 | Tubel et al. |
| 2006/0064972 A1 | 3/2006 | Allen |
| 2006/0175838 A1 | 8/2006 | Tips |
| 2008/0129254 A1 | 6/2008 | Frayne |
| 2009/0295163 A1 | 12/2009 | Frayne |

FOREIGN PATENT DOCUMENTS

| | | |
|---|---|---|
| DE | 102 41 854 | 4/2003 |
| JP | 2001157433 | 6/2001 |
| JP | 2006-291842 | 10/2006 |
| SU | 1798866 | 2/1993 |
| WO | WO2008151008 | 12/2008 |

OTHER PUBLICATIONS

3rd ASME/JSME Joint Fluids Engineering Conference, Jones, et.al, Oscillating-Wing Power Generation, p. 1-6, 1999.

Journal of Sound and Vibration, Shahrzad, et.al, Limit Cycle Flutter of Airfoils in Steady and Unsteady Flows, 256(2): 213-225, 2002.

Sharp, P., Proposed Fluttermill Semi-Random Flutter, 0, 2007.

Sharp, P., Proposed Fluttermill. Ganged, 0, 2007.

Journal of Micromechanics and Microengineering, Institute of Physics Pubishing, Makoto Mizuno et.al, Investigation of a resonance microgenerator, vol. 13, No. 2, pp. 209-216, Mar. 2003, Bristol, GB.

Sharp, P., The Flutter Mill, p. 1-6, Jun. 2007.

Journal of Fluids Engineering, Shimizu, et.al, Multiobjective Design Study of a Flapping Wing Power Generator, (130):021104-1-021104-8, Feb. 2008.

* cited by examiner

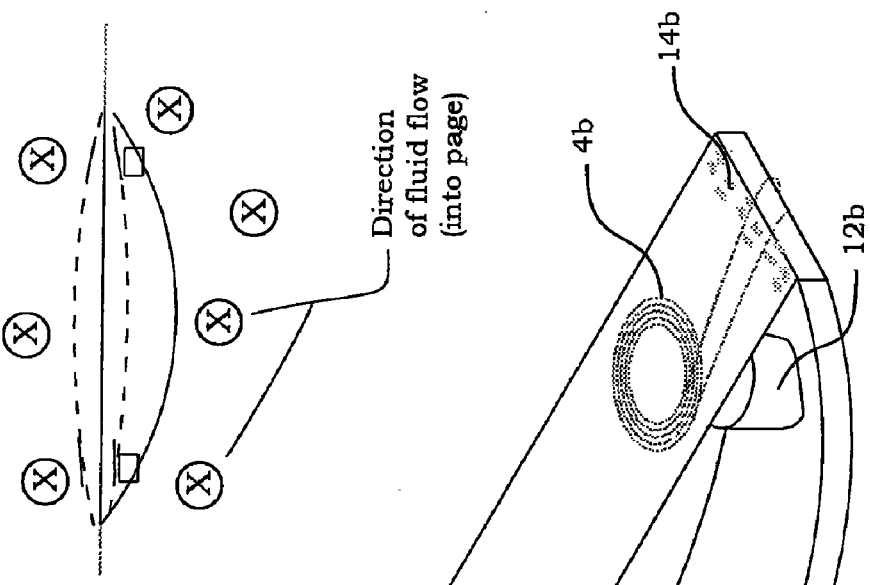
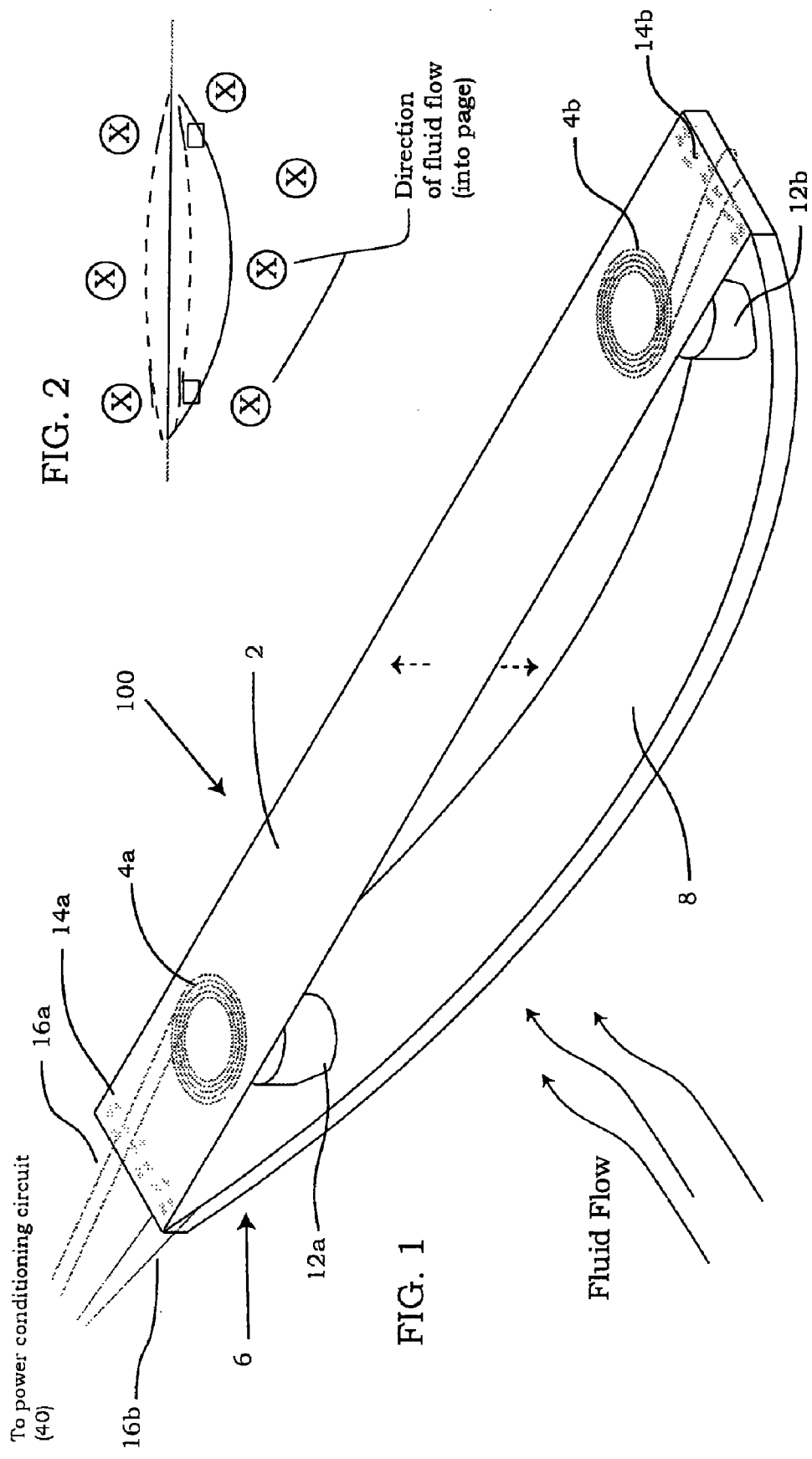

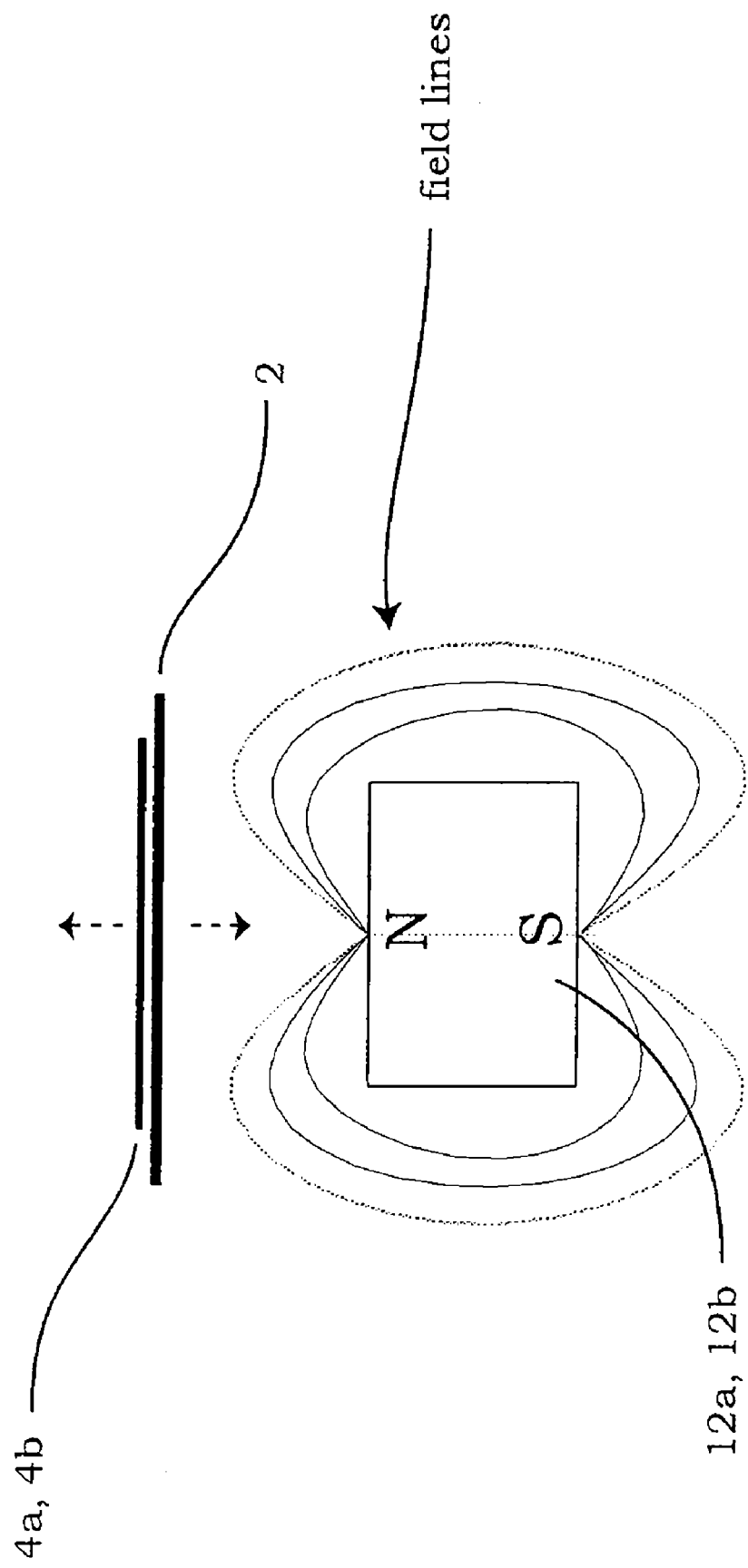

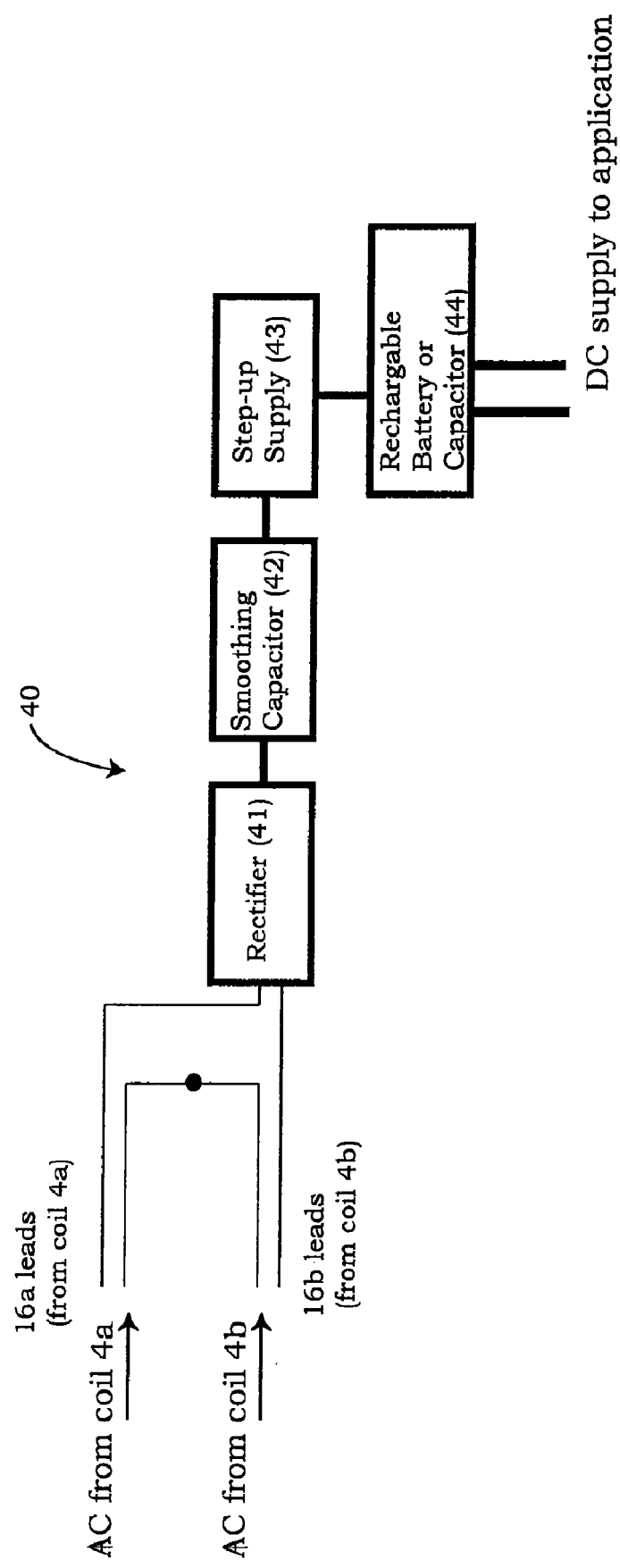

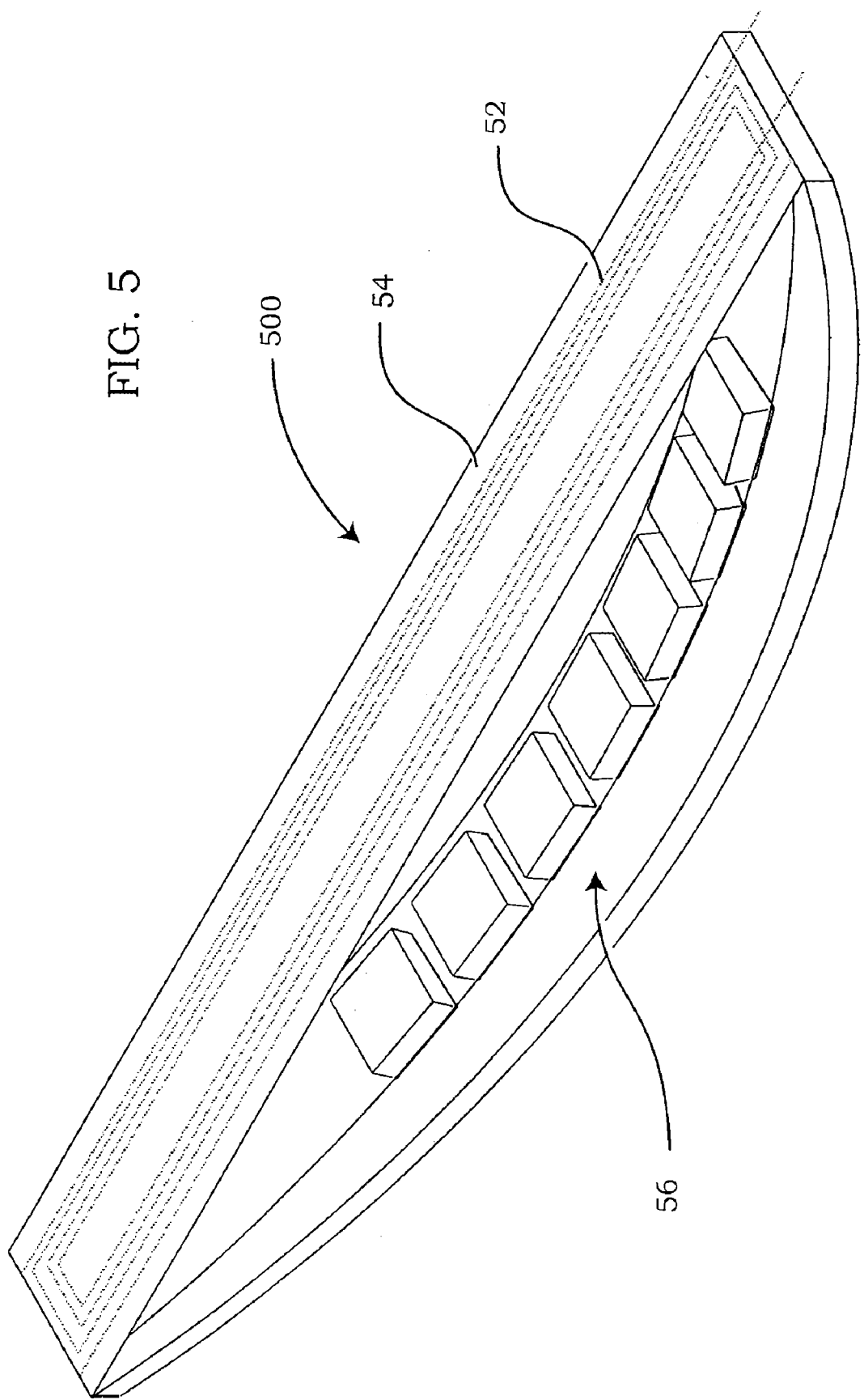

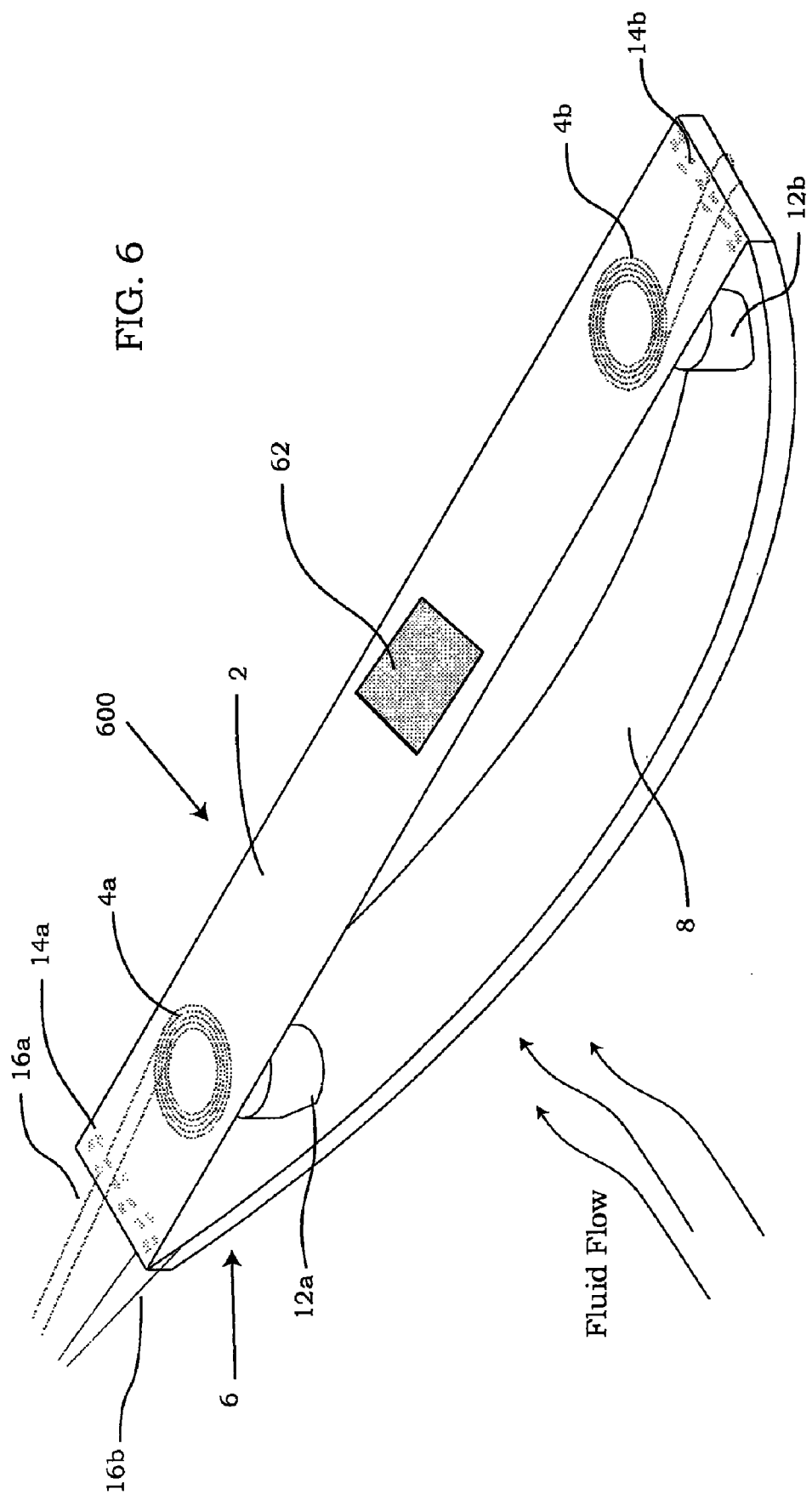

GENERATOR UTILIZING FLUID-INDUCED OSCILLATIONS

CROSS-REFERENCE TO RELATED APPLICATIONS

This application is a continuation of prior application Ser. No. 11/566,127, filed 1 Dec. 2006, which is incorporated in its entirety by this reference.

FIELD OF DISCLOSURE

This application generally relates to harvesting energy from flowing fluids, and more specifically, to a unique design of an energy converter and generator that induce oscillations by flowing fluids and utilize the oscillations to produce electricity.

BACKGROUND AND SUMMARY

The kinetic energy present in flowing fluids, such as wind or water, has been successfully applied towards productive human ends, such as grinding grain or pumping water. Wind-powered generators were developed to harness these fluid flows for the production of electricity. Today, wind-powered generators take on the largely ubiquitous form of a turbine, or rotating airfoil. While these turbine-based wind generators are generally useful in certain open spaces with consistently high-speed winds, drawbacks still exist, such as heavy initial capital costs, low efficiency at all but a narrow range of wind speeds, the lack of cost effectiveness at lower power outputs levels (<1 kW), etc.

To circumvent the drawbacks of the turbine-based devices, various alternative generators were designed to utilize other natural flow phenomena. However, these proposals were not satisfactory due to design complexities, added cost, the need for a complex mounting structure, low efficiency in energy production, insufficient power generation, inefficient production of vibrations, restriction to high flow speeds, etc.

This disclosure describes various embodiments of unique generators that effectively promote oscillations induced by flowing fluids, and utilize the oscillations in generating electricity or other types of energy. In one aspect, an exemplary generator harnesses the energy of fluid flows by way of a combination of flutter and vortices shedding induced along a tensioned membrane, or "belt", fixed at two or more points. The membrane may have an elongated shape or other kinds of shape that are known to promote vibrations with the flowing fluids.

An exemplary electrical generator includes at least one magnetic field generator, at least one electrical conductor, and at least one flexible membrane having at least two fixed ends. The membrane vibrates when subject to a fluid flow. One of the electrical conductor and the magnetic field generator is attached to the membrane and configured to move with the membrane. The vibration of the membrane caused by the fluid flow causes a relative movement between the electrical conductor and the applied magnetic field. The relative movement causes a change in the strength of the magnetic field applied to the electrical conductor, and the change in the strength of the magnetic field applied to the electrical conductor induces a current flowing in the conductor. One or all parts of the generator may be implemented as a MEMS (Micro Electro-Mechanical Systems) device. In one aspect, the direction of the magnetic field may be substantially perpendicular to an area enclosed by the electrical conductor, when the membrane does not vibrate.

The exemplary generator may further include at least one mass attached to the membrane, to promote movements or vibrations of the membrane when it is subject to fluid flows. In one embodiment, a power conditioning circuit may be provided to condition the induced current. The power conditioning circuit may include a rectifying circuit configured to rectify the current. In another embodiment, the magnetic field generator includes at least one permanent magnet. In still another embodiment, an exemplary generator includes multiple sets of electrical conductors, such as coils. The currents generated by the multiple sets of conductors may be combined in a serial manner. A rechargeable electrical power storage device, such as a battery or capacitor may be provided to be charged by the current or currents.

In one embodiment, the exemplary generator further includes a supporting structure. The fixed ends of the membrane are affixed to the supporting structure. The electrical conductor is attached to the membrane. The magnetic field generator is disposed on the supporting structure. In another embodiment, the magnetic field generator is attached to the membrane, and the electrical conductor is disposed on the supporting structure. In another embodiment, the magnetic field generator is oriented so as to project the magnetic field (i.e., pole to pole axis) perpendicular to the plane of the membrane. In still another embodiment, the magnetic field generator is oriented so as to project the magnetic field parallel to the plane of the membrane. Of course, the electrical conductors are rearranged in each corresponding embodiment to account for changes in the magnetic field direction.

According to another embodiment, the exemplary generator includes an adjustable tension provider, such as a motor, configured to apply an adjustable tension force between the fixed ends of the membrane according to the speed of the fluid flow. A sensor may be provided to generate a signal indicating an effect of the fluid flow. In one aspect, the tension force is adjusted based on the current.

According to another embodiment, the exemplary generator may include multiple flexible membranes. In one aspect, the membranes may affix to the same supporting structure.

Additional aspects and advantages of the present disclosure will become readily apparent to those skilled in this art from the following detailed description, wherein only exemplary embodiments of the present disclosure are shown and described, simply by way of illustration of the best mode contemplated for carrying out the present disclosure. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

BRIEF DESCRIPTION OF THE DRAWINGS

FIG. 1 is a perspective view of an exemplary generator according to this disclosure.

FIG. 2 is a side view of an exemplary mode of vibration of an illustrative embodiment.

FIG. 3 is an illustration of an exemplary orientation of permanent magnets and the generated field thereof.

FIG. 4 is a schematic diagram of an electrical circuit for processing the currents generated by an exemplary generator.

FIG. 5 is a perspective view of another embodiment of an exemplary generator.

FIG. 6 is a perspective view of still another embodiment of an exemplary generator utilizing oscillations caused by flowing fluids.

DETAILED DESCRIPTION OF ILLUSTRATIVE EMBODIMENTS

Figure 7:
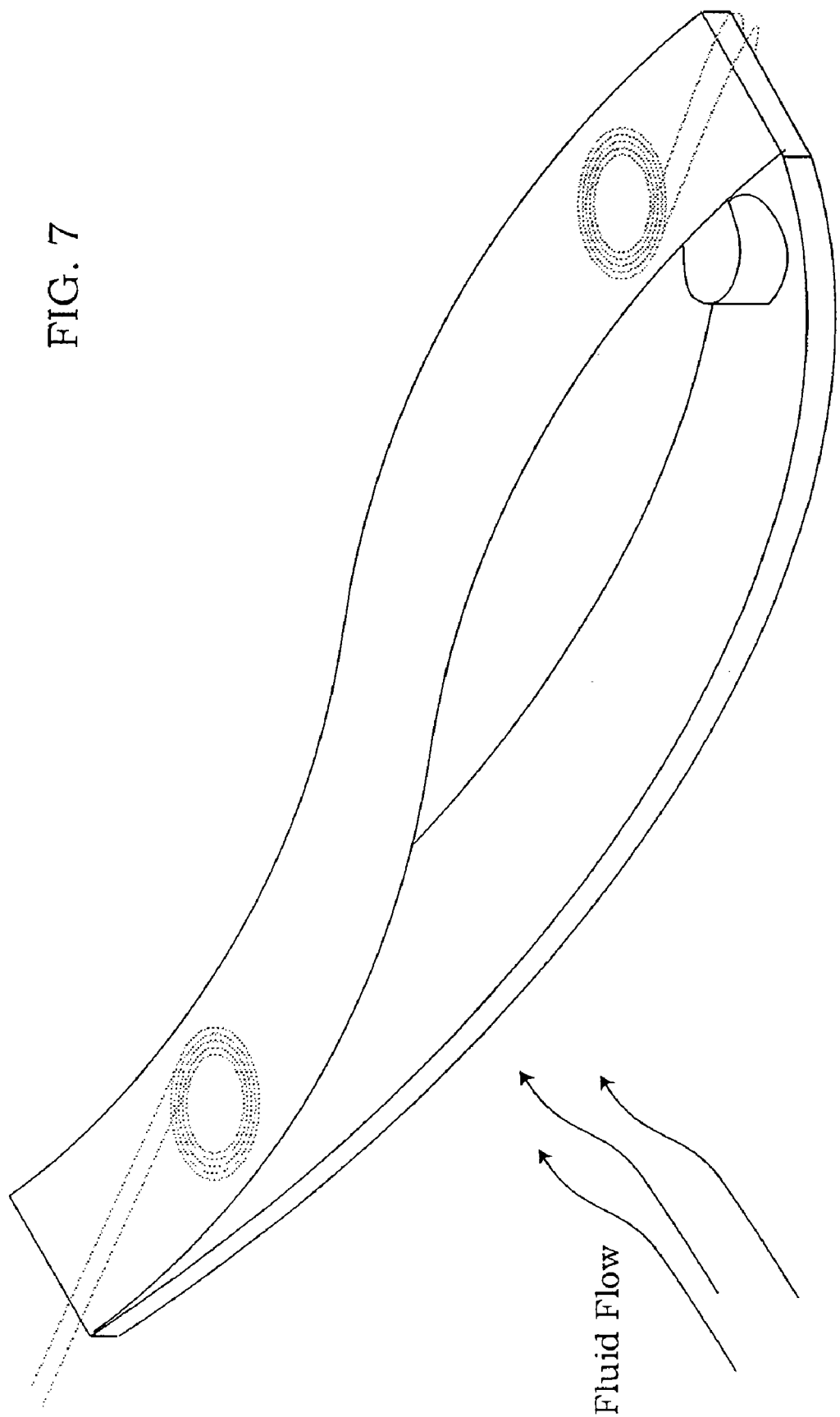
FIG. 7 is a perspective view of another mode of vibration.

In the following description, for the purposes of explanation, numerous specific details are set forth in order to provide a thorough understanding of the present disclosure. It will be apparent, however, to one skilled in the art that the present disclosure may be practiced without these specific details. In other instances, well-known structures and devices are shown in block diagram form in order to avoid unnecessarily obscuring the present disclosure.

An exemplary electrical generator includes a magnetic field generator and a flexible membrane for converting energy present in fluid flows, such as air flows, water flows, tides, etc., into vibrations or oscillations. The flexible membrane includes at least one electrical conductor attached thereto and has at least two fixed ends. The membrane vibrates when subject to a fluid flow. As used herein, the term "flexible" refers to a membrane that has the ability to morph into a large variety of determinate and indeterminate shapes without damage, in response to the action of an applied force.

The at least one electrical conductor may be implemented as aluminum or copper coils attached to the membrane and configured to move with the membrane. For instance, one or more coils are integrated into or onto the oscillating membrane. Those coils are suspended over corresponding magnetic field generators. In one embodiment, the coils are printed directly onto the membrane via techniques that have recently been developed for RFID tags and patch antennae.

The vibration of the membrane caused by the fluid flow causes a relative movement between the electrical conductor and the applied magnetic field. The relative movement causes a change in the strength of the magnetic field applied to the electrical conductor, and the change in the strength of the magnetic field applied to the electrical conductor induces a current flowing in the conductor.

When using wind or air flow to drive the exemplary generator, wind flows perpendicularly to the long axis of the membrane, such as a membrane having an elongated shape. The flowing fluid induces a spontaneous instability in the tensioned membrane known as flutter. The flutter of the membrane results in a regular, reduced torsion high energy oscillation mode in appropriately designed variations. This mode is often referred to as the first normal mode of oscillation. Additionally, vortices shedding may occur along the edges and surface of the membrane, in some cases enhancing the oscillation.

The vibration of the membrane thereby causes the coils to move relative to the magnets. A changing magnetic field cuts through the closed area defined by the coils, thus resulting in an EMF within said coils. Thereby an electricity flow results, without requiring the physical coupling of the vibrating membrane to a piston or cam system for power generation. This electric generator operates at a variety of wind speeds, including lower speeds than required for most turbine-based wind generators. Moreover, the cost of an exemplary generator of this disclosure is substantially lower than most other wind-based generators, and the absence of physically grinding parts offers the possibility of long, quiet, maintenance-free operation. No leading bluff bodies are required, although they can be employed if desired.

Additionally, the exemplary generator achieves better efficiencies, particularly at small scales, than that of turbine or turbine-less generators, such as those using conventional piezoelectric approach. Without the Betz limit restriction of airfoil-based rotary turbines, more relaxed efficiency limits can be established for this improved wind generator class.

The concepts disclosed herein address energy challenges in a wide array of fields, from energy harvesting for small scale RF sensor arrays to decentralized rural electrification to grid-connected large scale power supplies.

In some embodiments, the oscillation is in a mode with two relatively fixed nodes, while in other embodiments multiple nodes across the membrane may be established. Also, in some embodiments, the coils are positioned on the membrane and move relative to a stationary set of magnets, whereas in other embodiments the coils are stationary on the mount, and the magnets are affixed to the moving membrane. Additionally, the magnetic field may be produced by permanent magnets or electromagnetic induction, with some of the electricity created by the generator being routed into the wiring of electromagnets to maintain their field. The coils may assume various shapes, configurations or forms.

FIG. 1 depicts an exemplary generator 100 according to this disclosure. The generator 100 includes an elongated membrane 2, two coils 4a, 4b and a support structure 6. The supporting structure 6 includes a base 8 and two sections thereof for receiving permanent magnets 12a, 12b. Adhesives 14a, 14b are provided to join the membrane 2 to the base 8. A power conditioning circuit is provided on or off the base/membrane to process the currents produced by the coils 4a, 4b. The coils 4a, 4b are adhered to the surface of or within the membrane 2, and suspended over the magnets 12a, 12b, respectively. Two leads 16a, 16b are coupled to coils 4a, 4b, respectively. The tension applied to the membrane 2 is a function of the elasticity of the membrane 2 and the physical characteristics (i.e., young's modulus, etc.) of the base 8, along with the particular distance between the ends of the base 8.

The exemplary generator 100 shown in FIG. 1 operates as follows. A flow of fluid, which may include liquid flows of water for instance, or a flow of air such as that found in artificial ventilation systems or in natural wind, travels across the elongated and tensioned membrane 2. This fluid flow travels in a direction approximately perpendicular to the major axis of the membrane, after which a self-exciting oscillation of the membrane will begin. This oscillation often will initiate with a slight torsion of the membrane 2. However, this initial condition will quickly (approximately <1 sec) stabilize to an oscillation of the lowest normal mode with reduced torsion, such as that depicted in FIG. 2. As the membrane 2 vibrates, the coils 4a, 4b will likewise oscillate with the membrane 2, above the fixed permanent magnets 12a, 12b. A side view of this vibration is illustrated in FIG. 2.

FIG. 3 illustrates an exemplary orientation of the magnets 12a, 12b beneath the coils 4a, 4b. The magnetic field is oriented such that the closed area of the coils 4a, 4b is crossed by perpendicular field lines, as originally described by Michael Faraday. It should be noted that several orientations of the magnets will produce appropriately oriented magnetic fields. The strength of that field through the coils 4a, 4b changes as the coils 4a, 4b move relative to the stationary magnets 12a, 12b. This change in the magnetic field produces an electromotive force (EMF). The EMF creates a current, i.e., a flow of electrons, dependent on the load conditions, internal resistance, impedance, and a range of other factors.

In the first normal mode of oscillation, the coils 4a, 4b oscillate approximately in phase with each other. The electricity flowing through respective leads 16a, 16b may be combined without significant destructive interference. The leads 16a, 16b may be joined in parallel or series, depending on the desired voltages and currents fed into a power conditioning circuit associated with the generator 100.

The configuration shown in FIG. 1 effectively concentrates the energy of oscillation of the entire membrane at one or more discrete zones. This works in a similar fashion to the way in which a lever "concentrates" a large translated motion into a smaller motion with a greater potential force. This greater force nearer the ends of the membrane is what allows for the incorporation of heavier and thicker coils without dampening out the oscillation. Hence, a smaller magnetic field is needed to fill the smaller volume of space traveled by the coils, which translates to lesser magnet costs. Additionally, by placing the coils largely out of the path of the flowing fluid, the majority of the center area of the membrane can respond to those flows without impediment of wiring.

FIG. 4 shows a block diagram of an exemplary power conditioning circuit 40 using a series connection to achieve higher voltages for low wind speeds. The circuit 40 includes a rectifier 41, a smoothing capacitor 42, a step-up supply 43, and a power storage device 44, such as a rechargeable battery or a super capacitor. The rectifier 41 and the smoothing capacitor 42 convert the output of the coils 4a, 4b, which is in the form of an alternating current, into smooth direct current. The DC current is then fed into the step-up supply 43, or a boost converter, if a particular range of voltages is desired for the end application. The power storage device 44 is provided to buffer between the current drawn by the application and the supply from the coils 4a, 4b of the generator 100.

As shown in FIG. 1, the base 8 assumes the shape of a bow. The bow-shaped base provides an approximately constant tension on the membrane 2 over short deviations. So, as the membrane 2 stretches over time, the spring-action of the base 2 ensures that the membrane 2 remains at a particular tension. It is understood that other shapes of bases may be used to implement the generator 100. A flat unbowed base can also be used, and the natural elasticity of the membrane 2 itself can serve this same purpose. In another embodiment, constant force springs (such as Belleville washers) or compliant mechanisms may be attached to the ends of the membrane or incorporated into the structure of the base itself, so that a more reliable constant tension on the membrane 2 can be maintained over longer periods of time. For embodiments that the membrane(s) are vertically oriented, a constant restoring force can be generated with gravitational attraction, by attaching weights to the membrane 2 or base 8.

In another embodiment, a feedback system is built into the generator 100 to provide or apply greater tensioning of the membrane 2 in higher wind speeds. This feedback system may be implemented in a variety of ways, such as installing a solenoid within the base 2 of the mounting structure. The pushing force of the solenoid can then be varied in step with the electrical output of the coils 4a, 4b. In another embodiment, memory alloys or dielectric materials that change shape with varying input voltages are used to alter tension of the membrane 2 in response to the wind speeds detected by a sensor.

FIG. 5 depicts another embodiment of an exemplary generator 500 using the concepts of this disclosure, in which a coil 52 covers a larger area of the membrane surface 54. In order to maintain a similar electrical power output, more permanent magnets 56 would be needed to provide a similarly enlarged magnetic field. The design depicted in FIG. 5 is particularly useful for very small generators, such as MEMS devices or "generators on a chip", wherein a coil that covers a greater percentage of the membrane is acceptable, as the magnetic field needed to saturate the volume of the coil's translation is of a very limited order.

FIG. 6 illustrates a variation of the embodiment shown in FIG. 1. At least one mass 62 is provided on the membrane 2. The mass 62 may include one or more low-profile objects of either symmetric or asymmetric shape. For membranes with larger sizes (such as >0.5 meters in length), the attached mass 62 provides a more vigorous oscillation of the membrane 2. In some cases, the mass 62 acts to provide a source of instability at the onset of oscillation, thereby causing a slight initial torsion of the membrane 2. However, the location and geometry of the mass 62 and the tension, width, and length of the membrane 2 can be made such that this instability is quickly transformed into an oscillation of the first normal mode with reduced torsion.

FIG. 7 depicts another embodiment of this disclosure. In this embodiment, the arrangement of the coils and the membrane are similar to the generator shown in FIG. 1. However, the membrane in FIG. 7 is made to oscillate in other normal modes of vibration, such as the second mode illustrated in FIG. 7. Some simple alterations may be necessary in the power conditioning circuitry to accommodate the out of phase oscillation of a plurality of coils, but for larger generators these alternate modes may offer significant gains in efficiency.

While the examples shown in FIGS. 1 and 5-7 involve one or more coils moving with reference to a stationary set of permanent magnets, it is understood that other embodiments may be implemented in which the magnets are placed on the membrane and are thus made to move relative to stationary coils. The advantage of such an arrangement is that the wire leads coming from the coils do not suffer any bending stress, as may occur with the moving coil embodiments.

Figure 8:
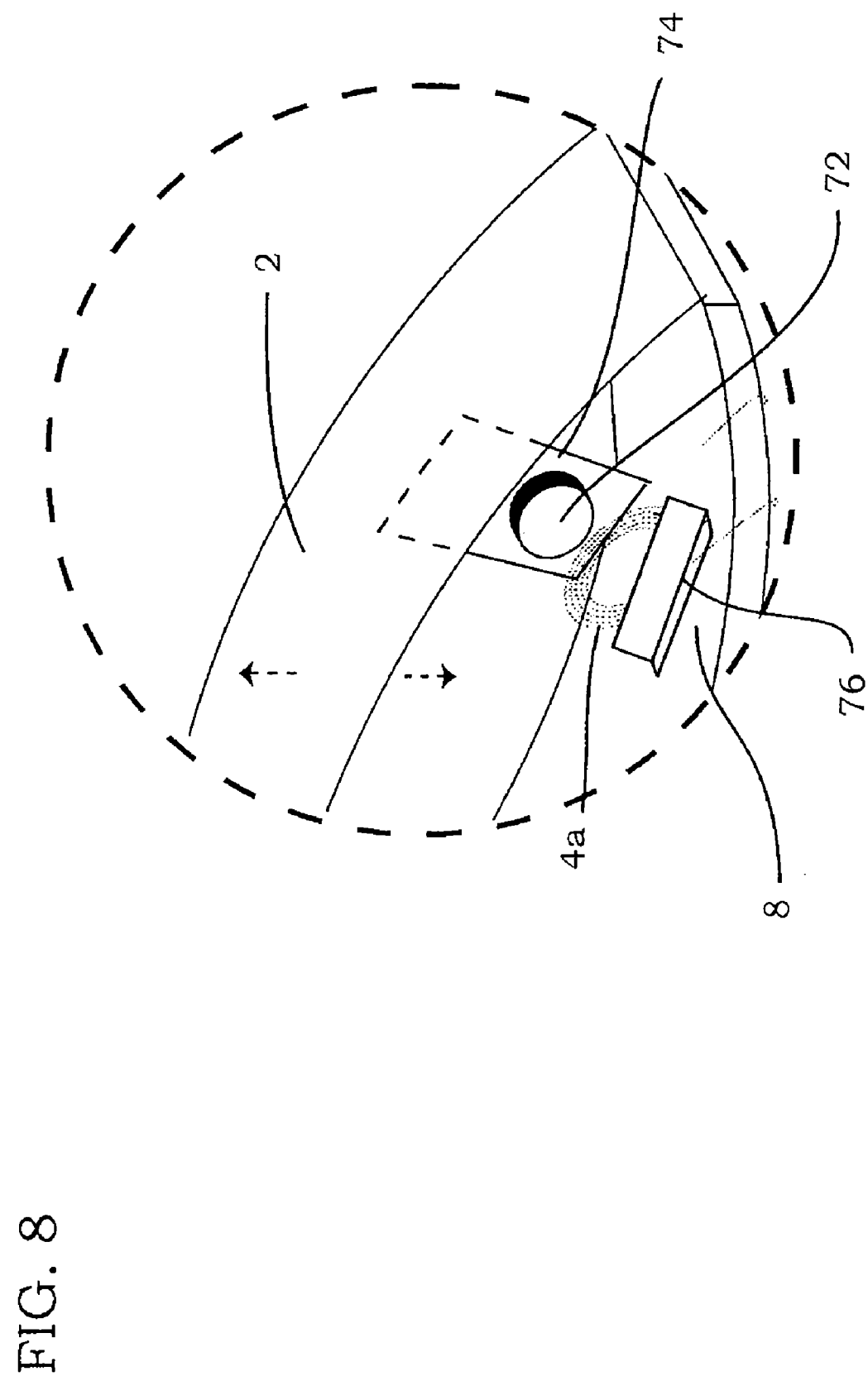
FIG. 8 is a sectional perspective view of an orientation variation of an exemplary generator.

Additionally, while the coil may be placed substantially parallel to the surface of the elongated membrane 2 as shown in FIG. 1, another option is to arrange the coil more substantially perpendicular to the membrane, either attached below or above the membrane 2. Of course, the orientation of the magnetic field to the permanent magnets will need to be altered to accommodate such a variation. Similarly, such reorientation options of the coil relative to the membrane also apply to embodiments in which the magnetic field generator is attached to the membrane 2 and the coil is affixed to the base 8. FIG. 8 illustrates a sectional view of an example of orienting a magnetic field generator, such as a magnet 72, so as to project the magnetic field (i.e., pole to pole axis) parallel to the plane of the membrane 2, with the corresponding coil flanking the side of said magnetic field generator. As shown in FIG. 8, the permanent magnet 72 is attached to a substantially rigid member 74, which itself is attached in a roughly perpendicular arrangement to the flexible membrane 2. The field produced by the permanent magnet 72 is directed through coil 4a, which is held in close proximity to the magnet 72 with a support 76. As the membrane 2 oscillates, the permanent magnet 72 will also oscillate. This oscillation will cause the strength of the magnetic field directed through coil 4a to change, thereby producing an EMF. This particular embodiment has the advantage of avoiding magnet-coil contact over a wide range of oscillation rates, as the magnet 72 moves along the face of the coil 4a rather than towards and away from said coil. Additional coils may be placed on the opposite side of the magnet 72 to benefit from the additional pole. According to a variation, the coil 4a and the magnet 72 may be backed with ferrous materials so as to form a complete magnetic circuit, as described in other sections of this application.

According to another embodiment, rather than adhering the coils to the membrane, a linear generator can be coupled to the oscillating membrane 2. While the most straight-forward approach to accomplishing this coupling would be to connect a shaft or thread between the magnet of the linear generator and the membrane, a smaller magnet incorporated onto the membrane can be used to stimulate oscillation in the linear generator's magnet without contact, by either repulsion or attraction. The natural frequency of oscillation of the linear generator's magnet is preferably matching that of the driving oscillation of the membrane. This embodiment allows large generator installments to gain in efficiency.

Additional variations may be provided to enhance the performance of the exemplary generators for particular applications. For instance, it may be desirable to fill the coils of the generator with ferrite powder or laminated ferrous metals to enhance flux through the coils. Also, as is well known in the art, the magnetic field produced by the permanent magnets can be made into a "complete circuit" by appropriately placing laminated or powdered ferromagnetic or ferromagnetic materials around the magnet core. This technique ensures that the maximum magnetic field can be directed to the area of the coils.

A multitude of ferromagnetic materials can be used as the source of the magnetic field in the generator. NdFeB rare earth magnets, ceramic magnets, Alnico magnets, and Samarium-cobalt magnets are a few of the more popular options.

Additionally, electromagnets, also known as field coils in generator applications, may be used in place of permanent magnets as a source of a magnetic field. One or more coils of wire with either air cores or with ferromagnetic cores may function as the field coils. These field coils are charged with a small residual magnetic field in the core, to induce an initial small EMF in the moving membrane coils. A portion of this electrical flow is diverted back into the field coils, resulting in a still greater field. This increased field leads to an increasing EMF produced in the oscillating membrane coils, and this positive feedback loop continues until an equilibrium is reached, at which point the field coils are producing a strong field similar to that produced by a permanent magnet. These self-excited generators, as they are sometimes called, are usually classified into the subsets of "series" generators, "shunt" generators, or "compound" generators, the principles of which are well known in the art. Another possibility is to use field coils that are separately excited, with the electrical flows necessary for a field provided by an external source. Both of these non-permanent magnet options are particularly useful for larger installations, where the cost of large permanent magnets would be prohibitive.

Some other variations involve the membrane. The form of the membrane does not need to be limited to a rectangular shape. Rather, tapered membranes and membranes of various geometries may offer significant advantages at certain scales. Also, the membrane need not be limited to flat webs of film or fabric, but can also be made into profiles more closely approximating airfoils, to enhance the oscillation characteristics of the elongated flexible membrane. Moreover, the web need not be continuous throughout, but rather may incorporate holes or depressions. In some cases, holes centered on the membrane-mounted coils may allow the base-mounted magnets to pass partially through said coils, thereby preventing membrane-magnet collision in certain embodiments during vigorous oscillations.

Most embodiments described thus far can also be oriented in any direction, such as vertically mounted on a pole, or horizontally mounted between two towers, or any combinations or variations thereof. A exemplary generator of this disclosure may be made with any number of membrane materials, such as ripstock nylon, superthin polyester film, mylar-coated taffeta, Kevlar tapes, or polyethylene film, to name a very few of a large set of possibilities.

Multiple generators can also be used in power installations to supply electricity at various levels for a given area or application. A cost effective embodiment involves the use of two membranes with embedded coils, each placed on opposite sides of the permanent magnets. This arrangement allows for the utilization of both poles of the magnetic field. The AC output of each membrane of this dual membrane variation may not be in phase, and so can be rectified and conditioned separately, and then recombined into an additive DC output. Clearly, a multitude of these generators can be stacked onto a tower or arranged in a framework to capture the energy of a large cross-sectional area of wind, rather than only capturing the small area seen by a single generator alone.

Another variation of an exemplary generator includes a membrane stretched between two distant points, for example, between two buildings or between two towers. In this case, a base that extends the entire length of the membrane is not necessary. Rather, clamps at the ends of the membrane can provide support for the membrane and the source of the field (whether that source is a set of permanent magnets or field coils). A spring or a specifically engineered compliant mechanism may be incorporated into the clamps so that constant tension is applied to the membrane, even across large distances.

An advantage of an exemplary generator according to this disclosure relates to the response to very high wind speeds. Typically, in conventional horizontal-axis turbine or vertical-axis generators, a furling mechanism must be incorporated into the design of the generator. This furling mechanism enables the blades of the generator to bend out of the wind flow, to avoid catastrophic damage in high wind conditions. This addition is a costly and complex feature in conventional wind-based generators. In some cases, the substantial kinetic energy of the turbine blades remains a hazard despite the precautions of furling. In contrast, an exemplary generator according to this disclosure operates under carefully selected tension conditions. Therefore, in high winds that may pose a danger to the generator, the tension of the membrane can be simply reduced, or the membrane twisted slightly to greatly reduce coupling of the generator to the wind flows. When that occurs, the membrane will cease oscillation until it is safe to resume. Moreover, if the membrane does fail catastrophically and detaches from the mounting structure, the danger to the surrounding area is small comparing to conventional turbine-based generators.

Generators implemented according to this disclosure have many applications across a wide range of power scales. For instance, hundreds of small generators according to this disclosure can be disposed throughout the HVAC ducting of a building. These generators can tap the flows of air throughout the ducting network to provide a continuous supply of power to wireless sensors in the vicinity. These arrays of sensors are critical in the construction of "smart buildings." However, the sensors needed in the construction often employ batteries with three to five year life spans, which greatly increases the maintenance costs of the sensors over their ten or twenty year life cycles. The generators implemented according to this disclosure and disposed throughout the HVAC ducting reduce the reliance on batteries, and expand the reach of this field of distributed, long-life sensor arrays. According to another embodiment, the exemplary generators themselves may act as both a wind sensor and the power source needed for transmitting that sensor information, if the voltages produced at different wind speeds are known for a given design.

Another important application of the generators according to this disclosure is rural lighting, largely in emerging economies. Most households in the developing world spend up to twenty percent of their annual income on kerosene for lighting, a type of smoky, fuel-based lighting that is both a fire danger and an indoor air quality health hazard. A new lighting system may be implemented by coupling generators according to this disclosure at scales of tens of watts with highly efficient white LEDs. The new system can continuously provide clean, cheap lighting over a decade or more and could be paid for with several months' worth of kerosene expenses (US $10-$50). A related application of an exemplary generator of this disclosure is in powering nodes in a wireless data transmission network, such as WiFi, or meshed network.

According to one embodiment utilizing the configuration illustrated in FIG. 1, the membrane has an elongated shape having two fixed ends. The membrane is made of Mylar coated taffeta, and the measurements are 440 mm long, 25 mm wide and 0.1-0.15 mm thick. Two coils are adhered to the membrane at 74 mm from each fixed end. The coils are made of 38 awg enamel coated wire, each with approximately 150 turns and having a resistance of approximately 25 ohms. The coils are approximately ¾" in inner diameter, and ⅞" in outer diameter. These coils are wired in series to achieve a total resistance of approximately 50 ohms. The base is made of acrylic. Two cylindrical NdFeB magnets are positioned under the coils. The magnets are ½" thick, ¾" in diameter, and generate a 5840 Gauss surface field. The vertical oscillation of the membrane, peak to peak, is approximately 20 mm. This embodiment generates approximately 15-20 mW across a matched load, in a 9-10 mph wind (4-4.5 m/s), sufficient for powering a wireless transceiver for continuous RF transmission of information, such as temperature and voltage, and charging capacitors in the wireless transceiver. The smaller size of this embodiment makes it suitable for working in HVAC ducting for harvesting energy of air flows to power sensor arrays.

In another embodiment, an exemplary generator constructed according to the configuration shown in FIG. 1 utilizes a larger membrane that is made of mylar coated taffeta or ripstock nylon, and is 1.75 meters long, 50 mm wide, on both steel and HDPE bases. In one embodiment, a thin rectangular piece of steel having a size of approximately 1.5"×1.5" is adhered to the middle of the membrane to act as the mass illustrated in FIG. 6. Two rectangular coils of 28 awg wire are adhered near the ends of the belt and suspended over corresponding rectangular NdFeB magnets. This power generated by this exemplary generator across a matched load in 10 mph winds is approximately 0.5-1 W, suitable for charging cell phones or providing power to lighting in rural areas.

While the above embodiments have been discussed using examples of capturing the energy of air flows, it is understood that the same designs may also be applied to capturing the energy of water flows. For instance, a generator with a modified membrane, with less viscous drag characteristics, could be placed at the seafloor to capture the energy of ocean currents. Additionally, in a similar fashion to the energy harvesting in HVAC systems discussed, a generator based on the principles of the present disclosure can be incorporated into water piping. A combination of ocean current and wind generators could be used to form a remote sensor array on open bodies of water, although either the ocean current or wind generator alone could also serve this purpose.

It is understood that one or more parts or modules of the exemplary generators described herein may be sold separately for assembly into a generator as described in this disclosure. For instance, an energy converter may be provided for use in an electrical generator having a magnetic field. The converter comprises at least one flexible membrane. Each membrane has at least two fixed ends, and is exposed to the magnetic field when used in the generator. In addition, the membrane vibrates or oscillates when subject to a fluid flow. Each membrane has at least one attached electrical conductor. The vibration of each membrane caused by the fluid flow creates a movement of the conductor relative to the magnetic field. The relative movement of the conductor creates a change in the strength of the magnetic field applied to the electrical conductor. The change in the strength of the magnetic field applied to the electrical conductor induces a current flowing in the conductor. It is also understood that a generator may utilize multiple sets of energy converters to produce power at a larger scale.

According to another embodiment, an exemplary energy converter is provided for use in an electrical generator including one of at least one magnetic field generator and at least one electrical conductor. The converter comprises at least one flexible membrane and the other one of the at least one magnetic field generator and the at least one electrical conductor attached to the membrane. Each membrane has at least two fixed ends. In addition, each membrane vibrates when subject to a fluid flow. The vibration of each membrane caused by the fluid flow creates a relative movement between the at least one conductor and a magnetic field generated by the at least one magnetic field generator. The relative movement creates a change in the strength of the magnetic field applied to the at least one electrical conductor. The change in the strength of the magnetic field applied to the at least one electrical conductor induces a current flowing in the at least one electrical conductor.

The disclosure has been described with reference to specific embodiments thereof. It will, however, be evident that various modifications and changes may be made thereto without departing from the broader spirit and scope of the disclosure. The concepts described in the disclosure can apply to various operations of the networked presentation system without departing from the concepts. The specification and drawings are, accordingly, to be regarded in an illustrative rather than a restrictive sense.

What is claimed is:

1. A method for modifying the performance of an electrical generator in response to environmental conditions comprising the steps of:
    providing a flexible membrane having at least two fixed ends;
    allowing the membrane to vibrate when subject to a fluid flow;
    providing an electrical conductor, providing a magnetic field generator that applies a magnetic field to the electrical conductor, and attaching one of the electrical conductor and the magnetic field generator to the membrane;
    detecting the speed of the fluid flow;
    adjusting the membrane based upon the detected speed of the fluid flow.

2. The method of claim 1, wherein the step of detecting the speed of the fluid flow includes the step of detecting and comparing the voltage generated by the electrical generator.

3. The method of claim 1, wherein the step of adjusting the membrane includes adjusting the tensioning of the membrane.

4. The method of claim 3, wherein the step of adjusting the tensioning of the membrane includes the step of adjusting the tension of the membrane if the detected speed of the fluid flow is greater than a predetermined value.

5. The method of claim 4, wherein the step of adjusting tensioning of the membrane includes reducing the tension of the membrane.

6. The method of claim 3, wherein the step of adjusting tensioning of the membrane includes maintaining a predetermined tension in the membrane.

7. The method of claim 6, wherein the step of adjusting tensioning of the membrane includes the steps of providing a constant force mechanism, coupling the constant force mechanism to the two fixed ends of the membrane, and allowing the constant force mechanism to maintain a predetermined tension in the membrane.

8. The method of claim 7, wherein the step of providing a constant force mechanism includes the step of providing a constant force spring.

9. The method of claim 1, wherein the step of adjusting the membrane includes twisting the membrane.

10. The method of claim 9, wherein the step of twisting the membrane includes twisting the entire membrane.

11. The method of claim 9, wherein the step of twisting the membrane includes twisting the membrane if the detected speed of the fluid flow is greater than a predetermined value.

12. An electrical generator and fluid flow detector comprising:
a flexible membrane having at least two fixed ends, wherein the membrane vibrates when subject to a fluid flow;
an electrical conductor and a magnetic field generator that applies a magnetic field to the electrical conductor, wherein one of the electrical conductor and the magnetic field generator is attached to the membrane and configured to move with the membrane;
wherein the vibration of the membrane caused by the fluid flow causes a relative movement between the electrical conductor and the applied magnetic field;
whereby the relative movement causes a change in the strength of the magnetic field applied to the electrical conductor; and the change in the strength of the magnetic field applied to the electrical conductor induces a current flowing in the conductor; and wherein the current is detected to indicate the presence of a fluid flow.

13. The generator of claim 12, further comprising a second magnetic field generator that is used to stimulate oscillation.

14. The generator of claim 13, further comprising a linear generator that includes a magnet, wherein the second magnetic field generator is used to stimulate oscillation of the magnet of the linear generator.

15. The generator of claim 13, wherein the second magnetic field generator is incorporated into the membrane.

16. The generator of claim 13, wherein the second magnetic field generator is used to stimulate oscillation without contact by providing a force selected from the group consisting of repulsion and attraction.

17. The generator of claim 12, further comprising a linear generator coupled to the membrane.

18. The generator of claim 12, further comprising a low profile mass provided on the membrane that reduces torsion of the vibration of the membrane.

19. The generator of claim 18, wherein the low profile mass is of a symmetric shape.

20. The generator of claim 12, wherein the electrical conductor includes a set of coil that is filled with a flux enhancer selected from the group consisting of ferrite powder and a laminated ferrous metal.

21. The generator of claim 12, wherein the magnetic field generator includes magnetic core that is surrounded with a field enhancer selected from the group consisting of laminated ferromagnetic material, powdered ferromagnetic material, and ferromagnetic material.

22. The generator of claim 12, wherein the magnetic field generator is an electromagnet.

23. The generator of claim 22, wherein the electromagnet includes a ferromagnetic core surrounded by a conductor.

24. The generator of claim 23, wherein the conductor is a coil.

25. The generator of claim 12, wherein the magnetic field generator is composed of a material selected from the group consisting of: NdFeB rare earth magnet, ceramic magnet, Alnico magnet, and Samarium-cobalt magnet.

26. The generator of claim 12, wherein the flexible membrane has a substantially elongated shape.

27. The generator of claim 26, wherein the flexible membrane has a shape selected from the group consisting of: tapered, flat, and airfoil-like.

28. An electrical generator and fluid flow detector comprising:
a flexible membrane having at least two fixed ends, wherein the membrane vibrates when subject to a fluid flow;
a supporting structure, wherein the fixed ends of the membrane are affixed to the supporting structure,
an electrical conductor and a magnetic field generator that applies a magnetic field to the electrical conductor, wherein the magnetic field generator is attached to the membrane and the electrical conductor is positioned on the supporting structure;
wherein the vibration of the membrane caused by the fluid flow causes a relative movement between the electrical conductor and the applied magnetic field;
whereby the relative movement causes a change in the strength of the magnetic field applied to the electrical conductor; and the change in the strength of the magnetic field applied to the electrical conductor induces a current flowing in the conductor.

29. The generator of claim 28, further comprising at least one additional flexible membrane that includes at least two ends fixed to the supporting structure and an attached magnetic field generator that applies a magnetic field applied to an electrical conductor, wherein
the at least one additional flexible membrane vibrates when subject to a fluid flow; and
the vibration of the at least one additional flexible membrane caused by the fluid flow causes a relative movement between the magnetic field generator attached to the additional flexible membrane and the electrical conductor;
whereby the relative movement causes a change in the strength of the magnetic field applied to the electrical conductor attached to the at least one additional membrane; and the change in the strength of the magnetic field applied to the electrical conductor attached to the at least one additional membrane induces a current flowing in the conductor.

30. The generator of claim 29, further comprising an additional electrical conductor.

31. The generator of claim 29, wherein the current induced by the relative movement of the magnetic field generator on the flexible membrane is out of phase from the current induced by the relative movement of the magnetic field generator on the at least one additional flexible membrane.

32. The generator of claim 29, further comprising a second support structure, and wherein the at least two fixed ends of the at least one additional flexible membrane are fixed to the second support structure.

33. The generator of claim 32, wherein the support structure and the second support structure have a predetermined relative spatial relationship.

34. The generator of claim 33, further comprising frame work that determines the relative spatial relationship between the support structure and the second support structure.

35. An electrical generator and fluid flow detector comprising:
- a flexible membrane having a fixed end, wherein the membrane vibrates when subject to a fluid flow;
- an electrical conductor;
- a magnetic field generator attached to the membrane, wherein the magnetic field generator applies a magnetic field to the electrical conductor;
- wherein the vibration of the membrane caused by the fluid flow causes a relative movement between the electrical conductor and the applied magnetic field;
- whereby the relative movement causes a change in the strength of the magnetic field applied to the electrical conductor; and the change in the strength of the magnetic field applied to the electrical conductor induces a current flowing in the conductor.

36. The generator of claim 35, wherein the flexible membrane has two fixed ends.

37. The generator of claim 36, wherein the magnetic field generator is positioned at a location on the membrane substantially closer to a fixed end than to the middle of the membrane in between the two fixed ends of the membrane.

38. The generator of claim 35, wherein the magnetic field generator is positioned underneath the flexible membrane.

39. The generator of claim 35, further comprising a second magnetic field generator attached to the membrane.

40. The generator of claim 35, further comprising a second electrical conductor.

41. The generator of claim 35, further comprising a supporting structure, and wherein the electrical conductor is positioned on the supporting structure.

42. The generator of claim 35, wherein the electrical conductor is positioned adjacent to the magnetic field generator, and wherein the vibration of the membrane caused by the fluid flow causes the magnetic field generator to move substantially along a plane adjacent but not intersecting with the electrical conductor.

43. The generator of claim 42, further comprising a second electrical conductor positioned substantially opposite of the electrical conductor, and wherein the vibration of the membrane caused by the fluid flow causes the magnetic field generator to move substantially along a plane adjacent but not intersecting with both the electrical conductor and the second electrical conductor.

44. The generator of claim 43, wherein the electrical conductor and the second electrical conductor are positioned on opposite sides of the magnetic field generator.

45. A method for generating electricity from fluid flow comprising the steps of:
- providing a housing;
- providing a stationary element contained within the housing;
- providing a moving element contained within the housing;
- allowing the moving element to move within a range of motion relative to the stationary element when subject to a fluid flow;
- wherein there is no physical grinding between the moving element with both the housing and the stationary element within the range of motion;
- wherein the relative movement between the stationary element and the moving element generates electricity.

* * * * *